US012395777B2

(12) United States Patent
Xue et al.

(10) Patent No.: US 12,395,777 B2
(45) Date of Patent: Aug. 19, 2025

(54) AUDIO PROCESSING METHOD AND ELECTRONIC DEVICE

(71) Applicant: SZ DJI TECHNOLOGY CO., LTD., Shenzhen (CN)

(72) Inventors: Zheng Xue, Shenzhen (CN); Pinxi Mo, Shenzhen (CN); Yunfeng Bian, Shenzhen (CN); Yang Liu, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 292 days.

(21) Appl. No.: 18/095,390

(22) Filed: Jan. 10, 2023

(65) Prior Publication Data

US 2023/0164480 A1 May 25, 2023

Related U.S. Application Data

(63) Continuation of application No. PCT/CN2020/104517, filed on Jul. 24, 2020.

(51) Int. Cl.
*H04R 3/00* (2006.01)
*H04R 1/22* (2006.01)
(Continued)

(52) U.S. Cl.
CPC ............. *H04R 1/222* (2013.01); *H04R 3/005* (2013.01); *H04R 3/02* (2013.01); *H04R 3/04* (2013.01); *H04R 2410/07* (2013.01)

(58) Field of Classification Search
CPC ........ H04R 1/122; H04R 1/406; H04R 3/005; H04R 3/02; H04R 3/04; H04R 2410/07; H04R 2410/05; G10L 2021/02165
See application file for complete search history.

(56) References Cited

U.S. PATENT DOCUMENTS

2010/0278352 A1* 11/2010 Petit .................... G10L 21/0208 381/71.1
2011/0164770 A1 7/2011 Lindahl et al.
(Continued)

FOREIGN PATENT DOCUMENTS

CN 102137318 A 7/2011
CN 102209988 A 10/2011
(Continued)

OTHER PUBLICATIONS

International Search Report (Apr. 26, 2021).

*Primary Examiner* — James K Mooney
(74) *Attorney, Agent, or Firm* — Fideli Law PLLC; Qiang Li

(57) ABSTRACT

The present disclosure provides an audio processing method for an electronic device, the electronic device includes a main microphone, an auxiliary microphone, and a sound pickup protection structure performing at least one of: weakening an air current entering the sound pickup cavity of the auxiliary microphone from an external environment, or blocking a nongaseous substance from entering the sound pickup cavity of the auxiliary microphone. The audio processing method includes: obtaining a main audio signal collected by the main microphone and an auxiliary audio signal collected by the auxiliary microphone, and synthesizing a target audio signal from the main audio signal and the auxiliary audio signal. The audio processing method improves the quality of audio collected by the electronic device.

20 Claims, 7 Drawing Sheets

(51) Int. Cl.
*H04R 3/02* (2006.01)
*H04R 3/04* (2006.01)

(56) References Cited

U.S. PATENT DOCUMENTS

| | | | | |
|---|---|---|---|---|
| 2012/0140946 | A1* | 6/2012 | Yen | H04R 3/005<br>381/92 |
| 2012/0207315 | A1* | 8/2012 | Kimura | G10L 21/034<br>381/94.3 |
| 2019/0014429 | A1* | 1/2019 | Luke | H04R 29/005 |
| 2019/0253795 | A1* | 8/2019 | Ozcan | H04R 1/1083 |
| 2020/0260182 | A1* | 8/2020 | Son | H04R 29/006 |

FOREIGN PATENT DOCUMENTS

| | | | |
|---|---|---|---|
| CN | 102761808 | A | 10/2012 |
| CN | 103219012 | A | 7/2013 |
| CN | 106487971 | A | 3/2017 |
| CN | 206210386 | U | 5/2017 |
| CN | 109068251 | A | 12/2018 |
| CN | 109982179 | A | 7/2019 |
| CN | 111418010 | A | 7/2020 |
| WO | WO-2017024778 | A1 * | 2/2017 |

* cited by examiner

AUDIO PROCESSING METHOD AND ELECTRONIC DEVICE

RELATED APPLICATIONS

This application is a continuation application of PCT application No. PCT/CN2020/104517, filed on Jul. 24, 2020, and the content of which is incorporated herein by reference in its entirety.

TECHNICAL FIELD

Some exemplary embodiments of the present disclosure relate to the field of acoustic image technologies, and particularly to an audio processing method and an electronic device.

BACKGROUND

Audio is key data for media processing and should be of a high quality. In existing technologies, a microphone is mounted on an electronic device. The microphone is generally provided close to a surface of the electronic device, and a hole of a sound pickup channel is formed in the surface of the electronic device, such that the microphone may better receive vibration in air, and then perform sound-electricity conversion to form an audio signal.

With increasing complexity and diversification of sound pickup scenarios, the electronic device may encounter various abnormal conditions in a sound pickup process; for example, an air current or a pollutant may exist on the surface of the electronic device and thereby affecting the air vibration through the sound pickup channel, and the collected audio signals are low in quality, which bring difficulties to subsequent audio processing operations.

BRIEF SUMMARY

Some exemplary embodiments of the present disclosure provide an audio processing method and an electronic device, the audio processing method and the electronic device improve quality of an audio signal(s) collected by the electronic device under an abnormal condition.

In some exemplary embodiments, an electronic device is provided, including: a main microphone, including a sound pickup cavity in communication with an external environment where the electronic device is located; an auxiliary microphone, including a sound pickup cavity in communication with the external environment; a sound pickup protection structure being configured to at least weaken an air current entering the sound pickup cavity of the auxiliary microphone from the external environment, or block a nongaseous substance from entering the sound pickup cavity of the auxiliary microphone; at least one storage medium storing at least one set of instructions; and at least one processor in communication with the at least one storage medium, where during operation, the at least one processor executes the at least one set of instructions to: obtain a main audio signal collected by the main microphone and an auxiliary audio signal collected by the auxiliary microphone, and synthesize a target audio signal from the main audio signal and the auxiliary audio signal.

Some exemplary embodiments of the present disclosure provide the audio processing method and the electronic device, the electronic device may include the main microphone and the auxiliary microphone, the electronic device may further include the sound pickup protection structure, and the sound pickup protection structure may be set to weaken the air current entering the sound pickup cavity of the auxiliary microphone from the external environment and/or block the nongaseous substance from entering the sound pickup cavity of the auxiliary microphone. Thus, in an abnormal sound pickup scenario, the auxiliary microphone with the sound pickup protection structure may have a better sound pickup performance. The electronic device may record sounds based on the main microphone, correct the main audio signal collected by the main microphone using the auxiliary audio signal collected by the auxiliary microphone with the sound pickup protection structure, and generate the target audio signal, thus improving the quality of the audio signal collected by the electronic device under the abnormal conditions.

DETAILED DESCRIPTION

Figure 1:
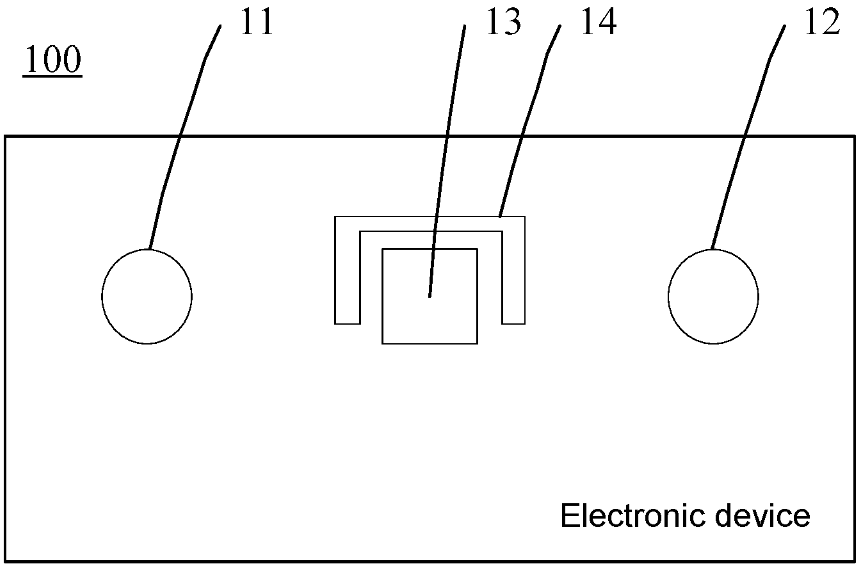
FIG. 1 is a structural diagram of an electronic device according to some exemplary embodiments of the present disclosure.

To clearly state the objectives, the technical solutions, and the advantages of some exemplary embodiments of the present disclosure, the following clearly describes the technical solutions of some exemplary embodiments of the present disclosure with reference to the accompanying drawings. Evidently, the described exemplary embodiments are merely some but not all of the exemplary embodiments of the present disclosure. All other embodiments obtained by a person of ordinary skill in the art based on the exemplary embodiments of the present disclosure without creative efforts shall fall within the protection scope of the present disclosure.

An audio processing method according to some exemplary embodiments of the present disclosure may be applied to an electronic device. The electronic device may include a main microphone and an auxiliary microphone, and a sound pickup cavity of the main microphone and a sound pickup cavity of the auxiliary microphone may be both in communication with an external environment where the electronic device is located. Both the main microphone and the auxiliary microphone may collect sounds in the external environment where the electronic device is located, so as to generate audio signals. For convenience of description, the audio signal collected by the main microphone may be referred to as a main audio signal, and the audio signal collected by the auxiliary microphone may be referred to as an auxiliary audio signal.

The electronic device may further include a sound pickup protection structure, and the sound pickup protection structure may be set to weaken an air current entering the sound pickup cavity of the auxiliary microphone from the external environment and/or block a nongaseous substance from entering the sound pickup cavity of the auxiliary microphone. In some exemplary embodiments of the present disclosure, the main microphone may be a microphone without the sound pickup protection structure in the electronic device, and the auxiliary microphone may be a microphone with the sound pickup protection structure in the electronic device. When the electronic device is located in different external environments, the sound pickup protection structure may have different influences on a sound receiving performance of the auxiliary microphone. When the electronic device is located in a normal sound pickup environment, for example, when the external environment of the electronic device has little wind and clean air, compared with the main microphone without the sound pickup protection structure, the sound pickup protection structure of the auxiliary microphone may reduce a frequency response and sensitivity of the auxiliary microphone in the sound receiving process, resulting in natural distortion of the auxiliary audio signal collected by the auxiliary microphone. When the electronic device is located in an abnormal sound pickup environment, for example, when the external environment of the electronic device has high wind or much dust in the air (for example, a high-speed motion scenario, an outdoor high wind scenario, dusty weather, or the like), since the sound pickup protection structure may weaken the air current entering the sound pickup cavity of the auxiliary microphone from the external environment, and/or, block the nongaseous substance from entering the sound pickup cavity of the auxiliary microphone, compared with the main microphone without the sound pickup protection structure, the auxiliary microphone with the sound pickup protection structure may have a higher resistance to the abnormal condition and a more robust sound pickup performance. Therefore, according to the different environments where the electronic device is located, the main microphone may be utilized to record sound normally, and when the main audio signal collected by the main microphone is abnormal, the main audio signal may be repaired and adjusted by the auxiliary audio signal collected by the auxiliary microphone, thereby achieving a more robust sound pickup performance with a higher tone quality.

Figure 2:
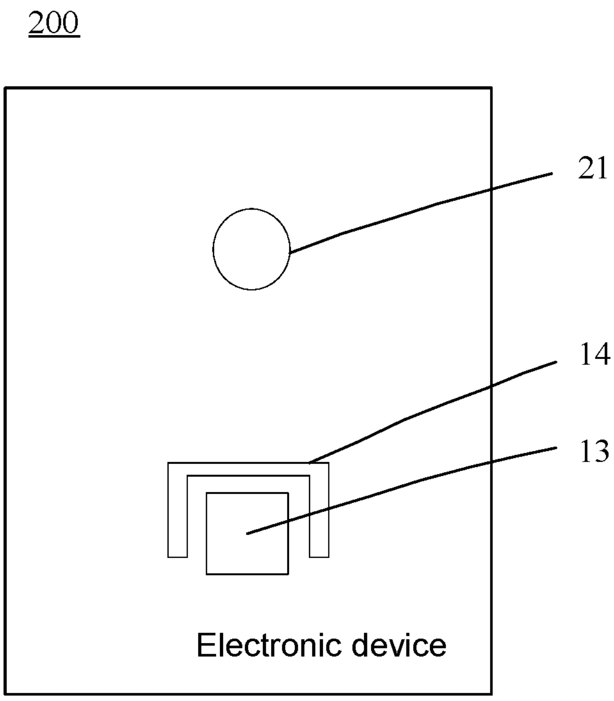
FIG. 2 is a structural diagram of an electronic device according to some exemplary embodiments of the present disclosure.

It should be noted that, numbers of the main microphone and the auxiliary microphone and positions thereof in the electronic device are not limited in the present disclosure. Exemplarily, FIG. 1 is a structural diagram of an electronic device according to some exemplary embodiments of the present disclosure, and FIG. 2 is a structural diagram of an electronic device according to some exemplary embodiments of the present disclosure. As shown in FIG. 1, the electronic device 100 may include two main microphones and one auxiliary microphone 13. The two main microphones may be a main microphone 11 and a main microphone 12 respectively. In some exemplary embodiments, the main microphone 11 and the main microphone 12 may be located on two opposite sides of the electronic device to collect sounds coming from different directions. The main microphone 11 and the main microphone 12 may also be a left-channel main microphone and a right-channel main microphone. The auxiliary microphone 13 may include a sound pickup protection structure 14. As shown in FIG. 2, the electronic device 200 may include one main microphone 21 and one auxiliary microphone 13, and the auxiliary microphone 13 may include a sound pickup protection structure 14.

In some exemplary embodiments, the main microphone may be close to a casing of the electronic device relative to the auxiliary microphone. The main microphone may be closer to the casing of the electronic device, such that the main audio signal collected by the main microphone may be more realistic. By providing the auxiliary microphone farther away from the casing of the electronic device, and by using the sound pickup protection structure, the auxiliary audio signal collected by the auxiliary microphone may have a higher resistance to the abnormal sound pickup condition, thus the auxiliary audio signal may be helpful in repairing the main audio signal in the abnormal scenario, thereby improving the sound pickup performance of the electronic device.

It should be noted that the sound pickup application scenario of the electronic device is not limited in the exemplary embodiments of the present application, and for example, may include, but is not limited to, at least one of a wind noise scenario, an overload scenario, or a microphone blockage scenario. Wind noise may refer to noise generated by an air current moving at a high speed. For example, in one exemplary scenario, when the electronic device records sounds, the air current moving at a high speed may create eddy noise around the electronic device. In another exemplary scenario, when the electronic device is mounted on a vehicle traveling at a high speed, such as an automobile, a motorcycle, or the like, to record sounds, high-speed wind may impact the electronic device to generate wind noise. In yet another exemplary scenario, wind may generate eddy noise at an acoustic inlet of the microphone (for example, a hole on a surface of the electronic device is in communication with the sound pickup cavity of the main microphone). Overload may also be known as peak clipping distortion and may refer to an abnormal scenario where a maximum value of an audio signal exceeds a maximum value which an audio track may record, resulting in an automatic clip of a part of a high sound pressure waveform. The microphone blockage scenario may also be referred to as a silent scenario, and may refer to an abnormal scenario where a maximum value of a collected audio signal is small due to blockage of a sound receiving channel of a microphone.

It should be noted that, structures of the sound pickup cavity of the main microphone and the sound pickup cavity of the auxiliary microphone are not limited in the present disclosure. For example, in some exemplary embodiments, the main microphone may include a first diaphragm and a first housing, and the first diaphragm and the first housing may form the sound pickup cavity of the main microphone. The auxiliary microphone may include a second diaphragm and a second housing, and the second diaphragm and the second housing may form the sound pickup cavity of the auxiliary microphone.

It should be noted that, the sound pickup protection structure is not limited in the present disclosure, and the sound pickup protection structure may be different in different application scenarios.

In some exemplary embodiments, the sound pickup protection structure may include a windproof structure, and the auxiliary microphone may be provided in the windproof structure, thus improving the resistance of the auxiliary microphone to the wind noise, and improving the sound pickup performance of the auxiliary microphone in the wind noise scenario.

In some exemplary embodiments, the windproof structure may include a hollow windproof enclosure and a support for supporting the windproof enclosure, and the auxiliary microphone may be provided in a cavity of the windproof enclosure.

In some exemplary embodiments, the sound pickup protection structure may include a dustproof structure, and the auxiliary microphone may be provided in the dustproof structure, thus reducing a chance that the auxiliary microphone is blocked by a pollutant, such as dust, water drops, or the like, and improving the sound pickup performance of the auxiliary microphone in the microphone blockage scenario.

In some exemplary embodiments, the dustproof structure may include at least one filter screen covering the auxiliary microphone. In some exemplary embodiments, when plural filter screens are provided, different filter screens may have same or different filtering functions. For example, the dustproof structure may include two filter screens covering the auxiliary microphone, and the two filter screens may be configured to filter solid pollutants, such as dust, or the like, and gaseous pollutants, such as water vapor, or the like, respectively.

In some exemplary embodiments, the sound pickup protection structure may include a soundproof structure, and the auxiliary microphone may be provided in the soundproof structure, thus reducing the sensitivity of the auxiliary microphone, and improving the sound pickup performance of the auxiliary microphone in the overload scenario.

It should be noted that the sound pickup protection structure may achieve one or more of the windproof function, the dustproof function, and the overload preventing function described above.

It should be noted that, a shape and a material of the sound pickup protection structure are not limited in the present disclosure.

Concepts involved in some exemplary embodiments of the present disclosure will be described below.

1. Wind Noise Degree Information

Each main microphone may correspond to wind noise degree information for indicating a degree of an influence of the wind noise on the main microphone. In some exemplary embodiments, the wind noise degree information may be a numerical value within a preset value range. The numerical value of the wind noise degree information may indicate the degree of the influence of the wind noise on the main microphone. The value range of the wind noise degree information is not limited in the present disclosure.

2. Microphone Blockage Degree Information

Each main microphone may correspond to microphone blockage degree information for indicating whether the main microphone has been abnormally blocked or indicating a blockage degree of the main microphone. In some exemplary embodiments, the microphone blockage degree information may be a numerical value within a preset value range. The numerical value of the microphone blockage degree information may indicate the blockage degree of the main microphone. The value range of the microphone blockage degree information is not limited in the present disclosure.

3. Overload Degree Information

Each main microphone may correspond to overload degree information for indicating whether the main microphone has been overloaded or indicating an overload degree of the main microphone. In some exemplary embodiments, the overload degree information may be a numerical value within a preset value range. The numerical value of the overload degree information may indicate the overload degree of the main microphone. The value range of the overload degree information is not limited in the present disclosure.

The following clearly describes the technical solutions of the exemplary embodiments of the present disclosure with reference to the accompanying drawings in the embodiments of the present application. Evidently, the described exemplary embodiments are merely some but not all of the embodiments of the present disclosure. All other embodiments obtained by a person of ordinary skill in the art based on the exemplary embodiments of the present disclosure without creative efforts shall fall within the protection scope of the present disclosure.

Figure 3:
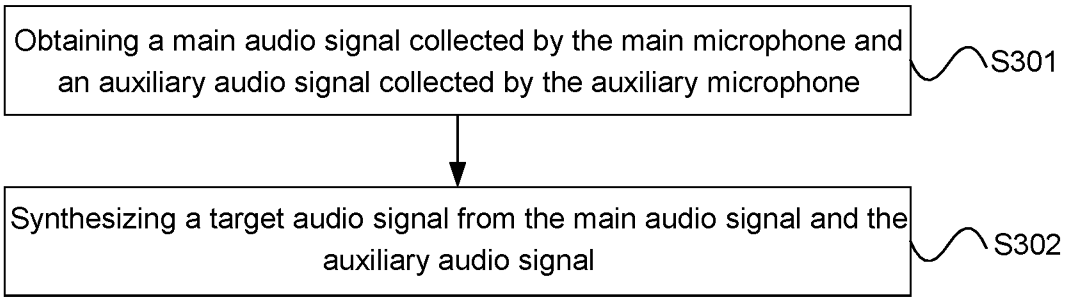
FIG. 3 is a flow chart of an audio processing method according to some exemplary embodiments of the present disclosure.

FIG. 3 is a flow chart of an audio processing method according to some exemplary embodiments of the present disclosure. In the audio processing method, an electronic device may serve as an executing body, and for a structure of the electronic device, reference may be made to the above description, which is not repeated herein. As shown in FIG. 3, the audio processing method according to some exemplary embodiments of the present disclosure may include:

S301: obtaining a main audio signal collected by the main microphone and an auxiliary audio signal collected by the auxiliary microphone.

Specifically, since the main microphone and the auxiliary microphone are located at different positions and the auxiliary microphone includes the sound pickup protection structure, usually, the main audio signal collected by the main microphone and the auxiliary audio signal collected by the auxiliary microphone are different. In the abnormal scenarios, such as the wind noise scenario, the overload scenario, the microphone blockage scenario, or the like, the auxiliary microphone with the sound pickup protection structure may have a better sound pickup performance.

S302: synthesizing a target audio signal from the main audio signal and the auxiliary audio signal.

As such, the audio processing method according to some exemplary embodiments may be applied to the electronic device. The electronic device may include the main microphone and the auxiliary microphone, the electronic device may further include the sound pickup protection structure, and the sound pickup protection structure may be set to weaken the air current entering the sound pickup cavity of the auxiliary microphone from the external environment and/or block the nongaseous substance from entering the sound pickup cavity of the auxiliary microphone. Thus, in the abnormal scenarios, such as the wind noise scenario, the overload scenario, the microphone blockage scenario, or the like, the auxiliary microphone with the sound pickup protection structure may have a better sound pickup performance. Therefore, on the basis of performing the normal sound recording operation utilizing the main microphone, the main audio signal may be further adjusted by the auxiliary audio signal collected by the auxiliary microphone with the sound pickup protection structure, so as to generate the target audio signal, thus improving the quality of the audio signal collected by the electronic device, and the sound pickup effect of the electronic device.

In some exemplary embodiments, the audio processing method may further include:

determining a plurality of audio components at different frequency bands in the auxiliary audio signal; and according to the frequency band corresponding to any one of the plural audio components and a preset corresponding relationship between the frequency band and a parameter adjustment for a frequency response parameter, determining a target parameter adjustment for the frequency response parameter of the audio component, and adjusting the frequency response parameter of the audio component according to the target parameter adjustment. The frequency response parameter may include an amplitude parameter and/or a phase parameter, and the corresponding relationship may be determined based on a deviation of the frequency response parameters of sample audios collected from a sample sound source by the main microphone and the auxiliary microphone in the electronic device respectively.

Correspondingly, in the S302, the synthesizing a target audio signal from the main audio signal and the auxiliary audio signal may include:

synthesizing the target audio signal from the main audio signal and the adjusted auxiliary audio signal.

A dividing manner of different frequency bands is not limited in the present disclosure.

In some exemplary embodiments, different frequency bands may include a plurality of frequency bands with continuous frequency ranges. For example, the whole frequency range may be denoted by $f_{min}$~$f_{max}$, and divided into the following five frequency bands according to a preset number of frequency bands, a preset frequency band interval, or other frequency band division rules: $f_{min}$~$f_1$, $f_1$~$f_2$, $f_2$~$f_3$, $f_3$~$f_4$ and $f_4$~$f_{max}$, and $f_{min}<f_1<_2<f_3<f_4<f_{max}$. It should be noted that the number of the frequency bands and the frequency range of each frequency band are not limited in the present disclosure.

In some exemplary embodiments, different frequency bands may include a plurality of frequency bands with non-overlapped frequency ranges, each frequency band may include a central frequency point f and a frequency offset F, and the frequency range of the frequency band may be (f−F)~(f+F). Two adjacent frequency bands may have continuous or discontinuous frequency ranges. For example, the whole frequency range may be denoted by $f_{min}$~$f_{max}$, and divided into the following five frequency bands: $(f_1-F_1)$~$(f_1+F_1)$, $(f_2-F_2)$~$(f_2+F_2)$, $(f_3-F_3)$~$(f_3+F_3)$, $(f_4-F_4)$~$(f_4+F_4)$ and $(f_5-F_5)$~$(f_5+F_5)$, where $f_1<f_2<f_3<f_4<f_5$, $f_1-F_1=f_{min}$, $(f_1+F_1)<(f_2-F_2)$, $(f_2+F_2)<(f_3-F_3)$, $(f_3+F_3)=(f_4-F_4)$ and $(f_5+F_5)<f_{max}$. Values of each central frequency point and each frequency offset are not limited in the present disclosure.

The frequency response may refer to a phenomenon that when an audio signal output at a constant voltage is connected with a system, a sound pressure generated by a loudspeaker box may be increased or attenuated with changes of a frequency, and a phase may change with the frequency, and the associated change relationship between the sound pressure and/or the phase and the frequency is called the frequency response. Since the frequency response is related to the frequency, in the present step, for the auxiliary audio signal, according to the preset corresponding relationship between the frequency band and the parameter adjustment for the frequency response parameter, the target parameter adjustment for the frequency response parameter corresponding to each audio component may be determined for each frequency band. For each audio component, the frequency response of the auxiliary audio signal may be corrected for each frequency band according to the target parameter adjustment for the frequency response parameter. The preset corresponding relationship between the frequency band and the parameter adjustment for the frequency response parameter may be determined based on the deviation of the frequency response parameters of the sample audios collected from the sample sound source by the main microphone and the auxiliary microphone in the electronic device respectively.

The determination of the preset corresponding relationship between the frequency band and the parameter adjustment for the frequency response parameter based on the deviation of the frequency response parameters of the sample audios collected from the sample sound source by the main microphone and the auxiliary microphone in the electronic device respectively may be implemented by a neural network model, and a type of the neural network model is not limited in the present disclosure. For example, a neural network may include, but is not limited to, a convolutional neural network (CNN), a recurrent neural network (RNN), and a long short-term memory (LSTM).

The frequency response of the auxiliary audio signal may be corrected for each frequency band, thus reducing a deviation between the frequency response of the auxiliary audio signal collected by the auxiliary microphone and the frequency response of the main audio signal collected by the main microphone, so as to guarantee accuracy of subsequent signal processing operations. Thus, in the abnormal scenarios, such as the wind noise scenario, the overload scenario, the microphone blockage scenario, or the like, on the basis of performing the normal sound recording operation utilizing the main microphone, the main audio signal may be further adjusted by using the auxiliary audio signal collected by the auxiliary microphone with the sound pickup protection structure and subjected to frequency response repair, so as to generate the target audio signal, thus improving the quality of the audio signal collected by the electronic device, and the sound pickup performance of the electronic device.

In some exemplary embodiments, the audio processing method may further include:

obtaining feature information of the main microphone. The feature information may include one or more of the wind noise degree information, the microphone blockage degree information, and the overload degree information.

Correspondingly, the synthesizing a target audio signal from the main audio signal and the adjusted auxiliary audio signal may include:

synthesizing the main audio signal and the adjusted auxiliary audio signal into the target audio signal according to the feature information of the main microphone.

The feature information of the main microphone may be used for indicating a degree of an influence of the abnormal condition on the main microphone. Therefore, the main audio signal and the adjusted auxiliary audio signal may be synthesized into the target audio signal according to the feature information of the main microphone, thus improving the quality of the target audio signal.

Next, based on the audio processing method shown in FIG. 3, the audio processing method is described in conjunction with different application scenarios. The electronic device may perform an audio processing operation for a single scenario or plural application scenarios, and a combination manner is not limited in the present disclosure.

In some exemplary embodiments of the present disclosure, the audio processing method is described in combination with the wind noise scenario. The feature information of the main microphone may be the wind noise degree information of the main microphone.

In some exemplary embodiments, the obtaining feature information of the main microphone may include:

determining the feature information according to the main audio signal and the auxiliary audio signal.

Specifically, in the wind noise scenario, since the main microphone and the auxiliary microphone in the electronic device are located at different positions and the auxiliary microphone includes the sound pickup protection structure, the wind noise may have a greater influence on the main audio signal collected by the main microphone and a smaller influence on the auxiliary audio signal collected by the auxiliary microphone. The wind noise degree information of the main microphone may be determined according to the main audio signal and the auxiliary audio signal, thus improving accuracy of the wind noise degree information of the main microphone.

In some exemplary embodiments, the wind noise degree information may be determined according to a signal correlation between the main audio signal and the auxiliary audio signal. The signal correlation may reflect a degree of association or similarity between the two signals. The greater the signal correlation, the more similar the two signals, and conversely, the smaller the signal correlation, the greater a difference between the two signals. In the wind noise scenario, the higher the signal correlation between the main audio signal and the auxiliary audio signal, the smaller the influence of the wind noise on the main microphone, and conversely, the lower the signal correlation between the main audio signal and the auxiliary audio signal, the greater the influence of the wind noise on the main microphone.

For example, with reference to FIG. 1, the electronic device may include two main microphones which are called the left-channel main microphone and the right-channel main microphone respectively. The main audio signal collected by the left-channel main microphone may be denoted as $x_L$, and a corresponding frequency domain signal may be denoted as $X_L$. The main audio signal collected by the right-channel main microphone may be denoted as $x_R$, and a corresponding frequency domain signal may be denoted as $X_R$. The electronic device may include one auxiliary microphone, the auxiliary audio signal collected by the auxiliary microphone may be denoted as $x_{Ref}$, and a corresponding frequency domain signal may be denoted as $X_{Ref}$. The wind noise degree information of the left-channel main microphone may be determined by the signal correlation between the main audio signal $x_L$ and the auxiliary audio signal $x_{Ref}$, and the wind noise degree information of the right-channel main microphone may be determined by the signal correlation between the main audio signal $x_R$ and the auxiliary audio signal $x_{Ref}$. Exemplarily, the correlation may be calculated using a classical cross-spectrum calculation (see formula 1). The correlation has a value ranging from 0 to 1, the closer the value is to 1, the closer the correlation is, and the lower the influence of the wind noise on the main microphone is. It should be noted that in the exemplary embodiments of the present disclosure, for convenience of distinction, the frequency domain signal corresponding to the main audio signal may also be referred to as a main frequency domain signal, and the frequency domain signal corresponding to the auxiliary audio signal may also be referred to as an auxiliary frequency domain signal. It should be noted that the correlation may also be calculated using other methods; for example, the signal correlation between the main audio signal and the auxiliary audio signal may be obtained in a time domain according to the main audio signal and the auxiliary audio signal.

$$R_L = \frac{|x_L * x_{Ref}^*|}{|x_L| * |x_{Ref}|},\ R_R = \frac{|x_R * x_{Ref}^*|}{|x_R| * |x_{Ref}|} \quad \text{(Formula 1)}$$

In some exemplary embodiments, the obtaining feature information of the main microphone may include:

obtaining the feature information according to the main audio signal.

This implementation is applicable when the electronic device includes a plurality of main microphones. In the wind noise scenario, since the main microphone does not include the sound pickup protection structure, the wind noise may have great influences on the main audio signals collected by the main microphones. The wind noise degree information of the main microphones may be determined according to the main audio signals collected by different main microphones, thus improving accuracy of the determination of the wind noise degree information of the main microphone.

In some exemplary embodiments, the electronic device may include at least two main microphones, and the obtaining the feature information according to the main audio signal may include:

obtaining a first frequency domain signal corresponding to a first main audio signal and a second frequency domain signal corresponding to a second main audio signal. The first main audio signal and the second main audio signal may be main audio signals collected by any two of the at least two main microphones respectively.

The wind noise degree information may be determined based on a correlation between the first frequency domain signal and the second frequency domain signal.

For example, with reference to FIG. 1, for the meaning of each signal, reference may be made to the description related to the above formula 1, which is not repeated herein. In the present example, the wind noise degree information of the left-channel main microphone or the right-channel main microphone may be determined by a signal correlation between the main audio signal $x_L$ and the main audio signal $x_R$. Exemplarily, the correlation may be calculated using a classical cross-spectrum calculation (see formula 2). The correlation has a value ranging from 0 to 1, the closer the value is to 1, the better the correlation is, and the smaller the influence of the wind noise on the main microphone is.

$$R_L = \frac{|x_L * x_R^*|}{|x_L| * |x_R|},\ R_R = \frac{|x_R * x_L^*|}{|x_R| * |x_L|} \quad \text{(Formula 2)}$$

In some exemplary embodiments, in order to collect sounds in different directions and improve an overall wind noise resistance of the main microphones, the at least two main microphones may be located on different sides of the electronic device respectively.

In some exemplary embodiments, if the number of the at least two main microphones is two, the two main microphones may be located on a first side and an opposite side of the first side (a second side) of the electronic device. A specific position of the first side on the electronic device is not limited in the present disclosure, and the first side may be set according to a shape of the electronic device and a sound collection requirement.

In some exemplary embodiments, the synthesizing the main audio signal and the adjusted auxiliary audio signal into the target audio signal according to the feature information of the main microphone may include:

determining a repair coefficient according to the feature information. The repair coefficient may include a first weight corresponding to the main audio signal and/or a second weight corresponding to the adjusted auxiliary audio signal.

The target audio signal may be synthesized according to the first weight and/or the second weight and the adjusted auxiliary audio signal.

Specifically, the wind noise degree information of the main microphone may indicate the degree of the influence of the wind noise on the main microphone. Usually, the greater the degree of the influence of the wind noise on the main microphone, the greater the degree to which the main audio signal collected by the main microphone is required to be repaired. The repair coefficients corresponding to the main microphone and/or the auxiliary microphone may be determined according to the wind noise degree information of the main microphone, and the target audio signal may be synthesized according to the repair coefficients, the main audio signal, and the adjusted auxiliary audio signal, thus improving the quality of the audios collected by the electronic device based on the main microphone and the auxiliary microphone, and improving the sound pickup performance.

In some exemplary embodiments, the repair coefficient may include the first weight and the second weight.

Correspondingly, the synthesizing the target audio signal according to the first weight and/or the second weight and the adjusted auxiliary audio signal may include:

obtaining the main frequency domain signal corresponding to the main audio signal and the auxiliary frequency domain signal corresponding to the adjusted auxiliary audio signal; and determining a sum of a first correction signal and a second correction signal as the target audio signal. The first correction signal may be a product of the main frequency domain signal and the first weight, and the second correction signal may be a product of the auxiliary frequency domain signal and the second weight.

In some exemplary embodiments, the main audio signal with a certain proportion may be combined with the adjusted auxiliary audio signal with a certain proportion to synthesize the final target audio signal, thus improving the quality of the audios collected by the electronic device based on the main microphone and the auxiliary microphone.

Figure 4:
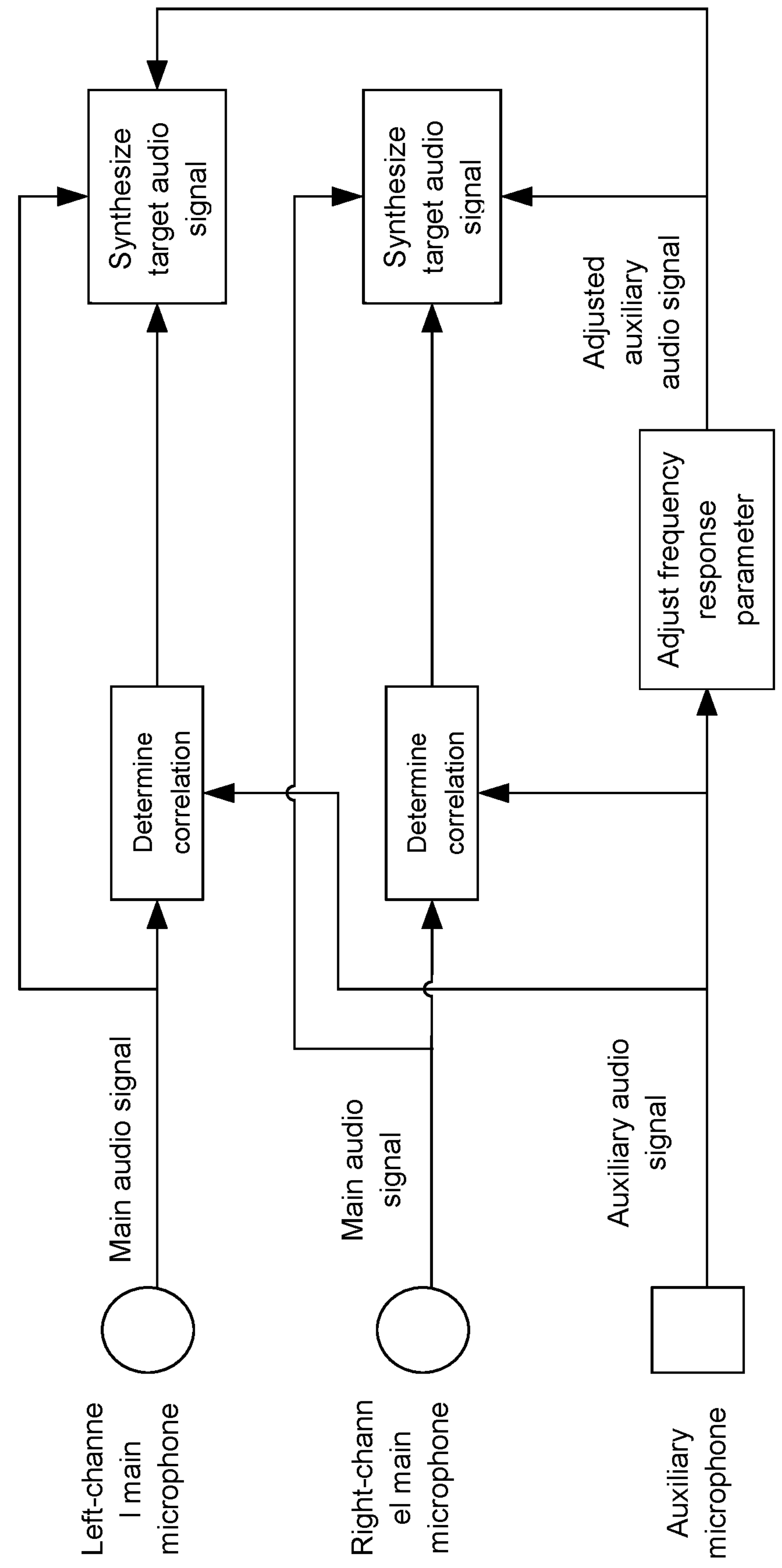
FIG. 4 is a diagram of an audio processing method according to some exemplary embodiments of the present disclosure in a wind noise scenario.

For example, with reference to FIGS. 1 and 4 for the meaning of each signal, reference may be made to the description related to the above formula 1, which is not repeated herein. The adjusted auxiliary audio signal may be denoted as $x_{Ref}$, and the corresponding frequency domain signal may be denoted as $X_{Ref}$. The wind noise degree information of the left-channel main microphone is denoted as $R_L$, the wind noise degree information of the right-channel main microphone is denoted as $R_R$, and reference may be made to the above-mentioned formula 1 or formula 2. The first weight corresponding to the left-channel main microphone determined according to the wind noise degree information of the left-channel main microphone is denoted as $ratio_L$, and the determined second weight corresponding to the auxiliary microphone is denoted as $ratio_{Ref1}$. The first weight corresponding to the right-channel main microphone determined according to the wind noise degree information of the right-channel main microphone is denoted as $ratio_R$, and the determined second weight corresponding to the auxiliary microphone is denoted as $ratio_{Ref2}$. For the target audio signals corresponding to the left-channel main microphone and the right-channel main microphone, reference may be made to formula 3.

$$X_L' = ratio_L X_L + ratio_{Ref1} X_{Ref}'$$

$$X_R' = ratio_R X_R + ratio_{Ref2} X_{Ref}' \quad \text{(Formula 3)}$$

In some exemplary embodiments, the wind noise degree information of the main microphone has a mapping function relationship with the first weight, a sum of the first weight and the second weight is equal to 1, and the mapping function relationship includes any one of a linear function relationship, an exponential function relationship, and a logarithmic function relationship.

For example, in the above formula 3, $ratio_{Ref1} = 1 - ratio_L$, and $ratio_{Ref2} = 1 - ratio_R$.

Figure 5:
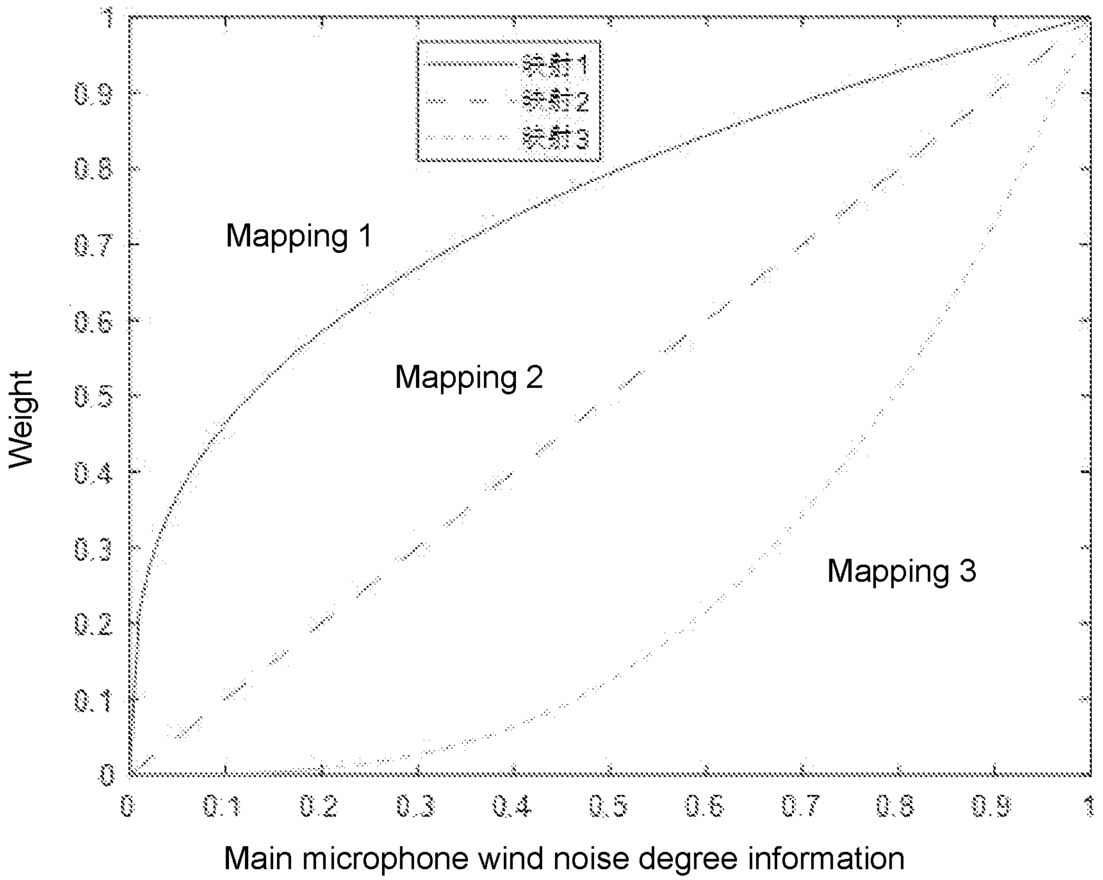
FIG. 5 is a diagram of a mapping function relationship according to some exemplary embodiments of the present disclosure.

The mapping function relationship is explained below with reference to FIG. 5. FIG. 5 is a diagram of the mapping function relationship according to some exemplary embodiments of the present disclosure, and shows three mapping function relationships between the wind noise degree information of the main microphone and a weight (specifically, the first weight). Mapping 1 shows a logarithmic function relationship, mapping 2 shows a linear function relationship, and mapping 3 shows an exponential function relationship. When the main microphones have same wind noise degree information, in the logarithmic function relationship, the main audio signal in the target audio signal may have a greater first weight, and correspondingly, the adjusted auxiliary audio signal may have a less second weight; in the exponential function relationship, the main audio signal in the target audio signal has a less first weight, and correspondingly, the adjusted auxiliary audio signal may have a greater second weight; in the linear function relationship, a fixed ratio exists between the first weight of the main audio signal in the target audio signal and the second weight of the adjusted auxiliary audio signal. The mapping function relationship may be determined according to different audio collection requirements; for example, when a realistic audio collection environment is desired to be restored, the logarithmic function relationship may be used.

In some exemplary embodiments, the audio processing method according to the present application is described in combination with the overload scenario. In some exemplary embodiments, the feature information of the main microphone may be the overload degree information of the main microphone.

In some exemplary embodiments, the obtaining feature information of the main microphone may include:

obtaining the feature information according to the main audio signal.

Specifically, in the overload scenario, usually, whether the microphone is overloaded is determined according to the audio signal collected by the microphone. Determination of the overload degree information of the main microphone according to the main audio signal is simple and easy.

In some exemplary embodiments, the obtaining the feature information according to the main audio signal may include:

obtaining a signal amplitude of the main audio signal in a first preset time period; and determining the overload degree information according to the signal amplitude in the first preset time period.

A value of the first preset time period is not limited in the present disclosure.

Specifically, the signal amplitude of the main audio signal collected by the main microphone may be constantly changing and fluctuating. The signal amplitude of the main audio signal in the first preset time period may be obtained and the overload degree information may be determined according to the signal amplitude in the first preset time period, thus weakening an influence of the fluctuation of the signal amplitude on judgment accuracy and improving accuracy of the determined overload degree information. For example, the overload degree information may be determined according to a maximum value, an average value, or a weighted average value of the signal amplitudes of the main audio signal in the first preset time period.

In some exemplary embodiments, the overload degree information may be determined according to a maximum value of an absolute value of the signal amplitude in the first preset time period.

For example, with reference to FIG. 1 or 2, taking any main microphone in the electronic device as an example, the main audio signal obtained by the main microphone is denoted as $x_M$, and the corresponding frequency domain signal is denoted as $X_M$. The absolute value of the signal amplitude of the main audio signal is denoted as $|x_M|$, and the maximum value of the absolute value of the signal amplitude of the main audio signal in the first preset time period is denoted as $\max|x_M|$. The overload degree information of the main microphone may be determined according to $\max|x_M|$. In some exemplary embodiments, the overload degree information of the main microphone may be $\max|x_M|$.

In some exemplary embodiments, the synthesizing the main audio signal and the adjusted auxiliary audio signal into the target audio signal according to the feature information of the main microphone may include:

determining a repair coefficient according to the feature information. The repair coefficient may include a first weight corresponding to the main audio signal and/or a second weight corresponding to the adjusted auxiliary audio signal.

The target audio signal may be synthesized according to the first weight and/or the second weight and the adjusted auxiliary audio signal.

Specifically, the overload degree information of the main microphone may indicate whether the main microphone is overloaded or an overload degree. Usually, the greater the overload degree of the main microphone, the greater the degree to which the main audio signal collected by the main microphone is required to be repaired. The repair coefficients corresponding to the main microphone and/or the auxiliary microphone may be determined according to the overload degree information of the main microphone, and the target audio signal may be synthesized according to the repair coefficients, the main audio signal, and the adjusted auxiliary audio signal, thus improving the quality of the audios collected by the electronic device based on the main microphone and the auxiliary microphone, and improving the sound pickup performance.

In some exemplary embodiments, the repair coefficient may include the second weight.

Correspondingly, the synthesizing the target audio signal according to the first weight and/or the second weight and the adjusted auxiliary audio signal may include:

determining whether the main microphone is overloaded according to the overload degree information; and if the main microphone is determined to be overloaded, determining a product of the adjusted auxiliary audio signal and the second weight as the target audio signal.

Figure 6:
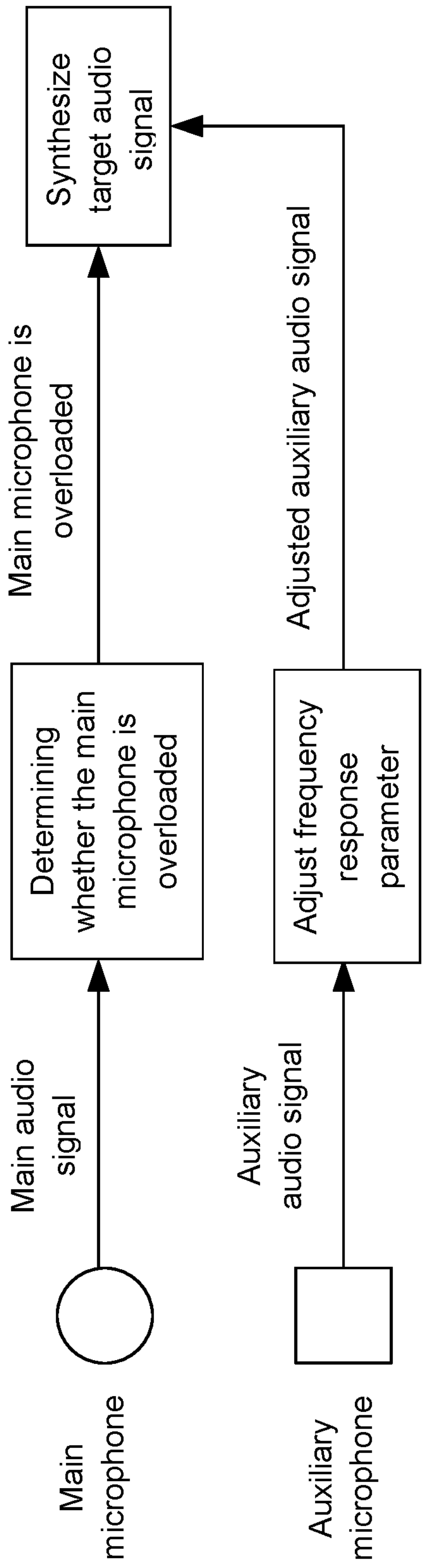
FIG. 6 is a diagram of an audio processing method according to some exemplary embodiments of the present disclosure in an overload scenario.

In some exemplary embodiments with reference to FIG. 6, if the main microphone is overloaded, the adjusted auxiliary audio signal may be proportionally used to synthesize the final target audio signal, and the second weight corresponding to the adjusted auxiliary audio signal may be determined according to the overload degree information of the main microphone, thus improving the quality of the audios collected by the electronic device based on the main microphone and the auxiliary microphone.

In some exemplary embodiments, the determining whether the main microphone is overloaded according to the overload degree information may include:

determining whether the overload degree information is greater than a first preset threshold;

if the overload degree information is greater than the first preset threshold, determining that the main microphone is overloaded; and if the overload degree information is less than or equal to the first preset threshold, determining that the main microphone is not overloaded.

A value of the first preset threshold is not limited in the present disclosure. In some exemplary embodiments, the first preset threshold may be related to a number of quantization bits for recording the audio signal. The number of quantization bits is a number of data bits after an analog quantity is converted into a digital quantity, and determines a dynamic range after an analog signal is digitized. For example, when the number of quantization bits is 16, the amplitude of the audio signal ranges from −32768 to 32767, and the first preset threshold may be $2^{15}-1=32767$. Similarly, the first preset threshold may be $2^7-1=127$ when the number of quantization bits is 8. The first preset threshold may be $2^{31}-1$ when the number of quantization bits is 32.

For example, the overload degree information of the main microphone is the maximum value of the absolute value of the signal amplitude of the main audio signal in the first preset time period, and is denoted as $\max|x_M|$. For example, the sounds may be recorded with 16 bits, and the first preset threshold may be 32767. If $\max|x_M|>32767$, the main microphone may be determined to be overloaded. If $\max|x_M|\leq 32767$, the main microphone may be determined to be not overloaded.

An implementation of the second weight corresponding to the adjusted auxiliary audio signal is described below.

In some exemplary embodiments, the second weight may be any one of:

$$\frac{A}{B},$$

$$R*\frac{A}{B}, \text{ and}$$

$$\text{ratio}*R*\frac{A}{B},$$

where $A=2^{m-1}$, and m represents the number of quantization bits of the main audio signal. B denotes a maximum value of an absolute value of a signal amplitude of the adjusted auxiliary audio signal within a third preset time period.

$$R=\frac{E}{A},$$

and E represents a mean square value of a signal amplitude of the main audio signal in the third preset time period. ratio represents a signal scaling factor set according to user requirements, and ratio>0.

Values of m, ratio and the third preset time period are not limited in the present disclosure.

For example, the main audio signal collected by the main microphone is denoted as $x_M$, and the corresponding frequency domain signal is denoted as $X_M$. The auxiliary audio signal collected by the auxiliary microphone is denoted as $x_{Ref}$, and the corresponding frequency domain signal is denoted as $X_{Ref}$. The adjusted auxiliary audio signal is denoted as $x_{Ref}$, and the corresponding frequency domain signal is denoted as $X_{Ref}$. The target audio signal may be denoted as $x_M'$. It is assumed that the number m of quantization bits is 16, and $A=2^{15}=32768$. B is denoted as $\max_{Ref}$ or $\max|x_{Ref}$, and E is denoted as $$\sqrt{|x_M^2|}\cdot R=\frac{\sqrt{|x_M^2|}}{32768},$$

R has a value ranging from 0 to 1, and the closer R is to 1, the higher the overload degree of the main microphone is.

In some exemplary embodiments, the second weight may be $$\frac{32768}{\max_{Ref'}},$$

and the target audio signal may be $$x_M'=x_{Ref}'*\frac{32768}{\max_{Ref'}}.$$

In some exemplary embodiments, the adjusted auxiliary audio signal may be directly amplified to a limit as the target audio signal. In some exemplary embodiments, the second weight may be $$R*\frac{32768}{\max_{Ref'}}=\frac{\sqrt{|x_M^2|}}{\max_{Ref'}},$$

and the target audio signal may be $$x_M'=x_R'*R*\frac{32768}{\max_{Ref'}}=x_R'*\frac{\sqrt{|X_M^2|}}{\max_{Ref'}}.$$

In some exemplary embodiments, the second weight may be ratio $$\text{ratio}*R*\frac{32768}{\max_{Ref'}}=\text{ratio}*\frac{\sqrt{|x_M^2|}}{\max_{Ref'}},$$

and the target audio signal may be $$x_M'=\text{ratio}*R*x_{Ref}'*\frac{32768}{\max_{Ref'}}=x_{Ref}'*\text{ratio}*\frac{\sqrt{|x_M^2|}}{\max_{Ref'}}.$$

In some exemplary embodiments, if R is greater than or equal to a second preset threshold, the second weight may be $$\frac{A}{B}.$$

Specifically, R has a value ranging from 0 to 1, and the greater the value of R, the higher the overload degree of the main microphone. If the value of R is greater than or equal to the second preset threshold, the adjusted auxiliary audio signal may be directly amplified to the limit as the target audio signal.

A value of the second preset threshold is not limited in the present disclosure.

In some exemplary embodiments, the audio processing method according to the present application is described in combination with the microphone blockage scenario. In some exemplary embodiments, the feature information of the main microphone may be the microphone blockage degree information of the main microphone.

In some exemplary embodiments, the obtaining feature information of the main microphone may include:

determining the feature information according to the main audio signal and the auxiliary audio signal.

Specifically, in the microphone blockage scenario, if the main microphone is blocked and the auxiliary microphone includes the sound pickup protection structure, a large difference may exist between the main audio signal collected by the main microphone and the auxiliary audio signal collected by the auxiliary microphone. The microphone blockage degree information of the main microphone may be determined according to the main audio signal and the auxiliary audio signal, thus improving accuracy of the determined microphone blockage degree information of the main microphone.

In some exemplary embodiments, the microphone blockage degree information may be determined according to a magnitude relationship between signal energy of the main audio signal and signal energy of the auxiliary audio signal.

Specifically, in the microphone blockage scenario, if the main microphone is blocked, the main audio signal collected by the main microphone may have lower signal energy. The microphone blockage degree information of the main microphone may be determined according to a magnitude relationship between the signal energy of the main audio signal and the signal energy of the auxiliary audio signal, thus improving the accuracy of the determined microphone blockage degree information of the main microphone.

Methods for obtaining the signal energy of the main audio signal and obtaining the signal energy of the auxiliary audio signal are not limited in the present disclosure, and the signal energy may be obtained in the time domain according to the main audio signal or the auxiliary audio signal, or in a frequency domain according to the frequency domain signal corresponding to the main audio signal or the frequency domain signal corresponding to the auxiliary audio signal.

In some exemplary embodiments, the microphone blockage degree information may be determined according to a ratio between the signal energy of the main audio signal and the signal energy of the auxiliary audio signal.

Specifically, the signal energy of the main audio signal and the signal energy of the auxiliary audio signal may be continuously acquired to obtain the ratio therebetween. In some exemplary embodiments, the ratio may be a ratio of the signal energy of the main audio signal to the signal energy of the auxiliary audio signal, or a ratio of the signal energy of the auxiliary audio signal to the signal energy of the main audio signal. In some exemplary embodiments, the ratio may be a ratio of an average value of the signal energy of the main audio signal and an average value of the signal energy of the auxiliary audio signal in a same time period. If the ratio suddenly changes, for example, if the ratio of the signal energy of the main audio signal to the signal energy of the auxiliary audio signal becomes smaller suddenly, the main microphone may be blocked. The microphone blockage degree information may be determined according to the ratio, for example, may directly be the ratio, or an average value or a weighted average value of the ratio over a period of time, which is not limited in the present disclosure.

For example, for any main microphone in the electronic device, the signal energy of the main audio signal collected by the main microphone may be represented as $Eng_{main}$, and the signal energy of the auxiliary audio signal collected by the auxiliary microphone may be represented as $Eng_{ref}$. The microphone blockage degree information is denoted as ratio, and reference may be made to formular 4:

$$\text{ratio}_H = \frac{Eng_{main,H}}{Eng_{ref,H}} \quad \text{(Formula 4)}$$

In some exemplary embodiments, the synthesizing the main audio signal and the adjusted auxiliary audio signal into the target audio signal according to the feature information of the main microphone may include:

determining a repair coefficient according to the feature information. The repair coefficient may include a first weight corresponding to the main audio signal and/or a second weight corresponding to the adjusted auxiliary audio signal.

The target audio signal may be synthesized according to the first weight and/or the second weight and the adjusted auxiliary audio signal.

Specifically, the microphone blockage degree information of the main microphone may indicate whether the main microphone is blocked or the blockage degree of the main microphone. The repair coefficients corresponding to the main microphone and/or the auxiliary microphone may be determined according to the microphone blockage degree information of the main microphone, and the target audio signal may be synthesized according to the repair coefficients, the main audio signal, and the adjusted auxiliary audio signal, thus improving the quality of the audios collected by the electronic device based on the main microphone and the auxiliary microphone.

In some exemplary embodiments, the repair coefficient may include the second weight.

Correspondingly, the synthesizing the target audio signal according to the first weight and/or the second weight and the adjusted auxiliary audio signal may include:

determining whether the main microphone is blocked according to the microphone blockage degree information; and if the main microphone is determined to be blocked, determining a product of the adjusted auxiliary audio signal and the second weight as the target audio signal.

Figure 7:
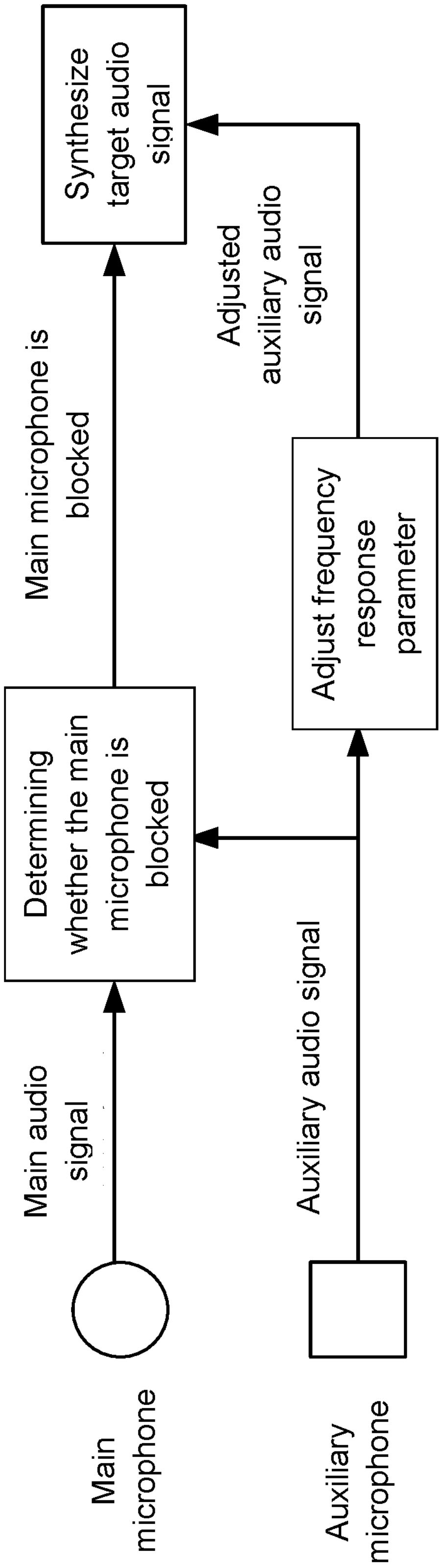
FIG. 7 is a diagram of an audio processing method according to some exemplary embodiments of the present disclosure in a microphone blockage scenario.

In some exemplary embodiments with reference to FIG. 7, if the main microphone is blocked, the adjusted auxiliary audio signal may be proportionally used to synthesize the final target audio signal, and the second weight corresponding to the adjusted auxiliary audio signal may be determined according to the blockage degree information of the main microphone, thus improving the quality of the audios collected by the electronic device based on the main microphone and the auxiliary microphone.

In some exemplary embodiments, the second weight may be 1.

Since the main microphone is blocked, the adjusted auxiliary audio signal may be directly used as the target audio signal, such that the method is simple and easy to implement.

In some exemplary embodiments, the determining whether the main microphone is blocked according to the microphone blockage degree information may include:

obtaining a plurality of pieces of microphone blockage degree information in a second preset time period;

obtaining an average value of the plurality of pieces of microphone blockage degree information;

determining whether the average value is less than a preset average value;

if the average value is less than the preset average value, determining that the main microphone is blocked; and if the average value is greater than or equal to the preset average value, determining that the main microphone is not blocked.

Values of the second preset time period and the preset average value are not limited in the present disclosure.

In some exemplary embodiments, based on the exemplary embodiment shown in FIG. 3 or some exemplary embodiments applicable to the wind noise scenario and the microphone blockage scenario, some exemplary embodiments of the present disclosure provide an audio processing method. To further improve the quality of the synthesized target audio signal, corresponding feature information of the main microphone in different frequency bands may be obtained, such that the target audio signal may be synthesized for each frequency band based on the feature information of the main microphone in each frequency band.

In some exemplary embodiments, the obtaining feature information of the main microphone may include:

performing frequency domain transformation on each target signal to obtain frequency components of the target signal in a plurality of frequency bands. The target signal may include the main audio signal, or the target signal may include the main audio signal and the auxiliary audio signal.

The feature information of the main microphone in each frequency band may be obtained according to the frequency components of the target signal in the plurality of frequency bands.

Correspondingly, the synthesizing the main audio signal and the adjusted auxiliary audio signal into the target audio signal according to the feature information of the main microphone may include:

obtaining frequency components of the adjusted auxiliary audio signal in the plurality of frequency bands; and for each of the plurality of frequency bands, according to the feature information of the main microphone in the frequency band, synthesizing the frequency component of the main audio signal in the frequency band and the frequency component of the adjusted auxiliary audio signal in the frequency band into a frequency component of the target audio signal in the frequency band.

A dividing manner of the plural frequency bands is not limited in the present disclosure. For example, reference may be made to the related description in S302, which is not repeated herein.

For the description of obtaining the feature information of the main microphone in each frequency band, reference may be made to the above related description of obtaining the feature information of the main microphone, and the principle is similar and not repeated herein.

For the step of according to the feature information of the main microphone in each frequency band, synthesizing the frequency component of the main audio signal in the frequency band and the frequency component of the adjusted auxiliary audio signal in the frequency band into a frequency component of the target audio signal in the frequency band, reference may be made to the above related description of the step of synthesizing the main audio signal and the adjusted auxiliary audio signal into the target audio signal according to the feature information of the main microphone, and the principle is similar and not repeated herein.

For example, the feature information of the main microphone in different frequency bands may be obtained in the microphone blockage scenario.

Audio signals may have different attenuation characteristics in a high frequency band and a low frequency band; in order to improve the accuracy of the determined microphone blockage degree information of the main microphone, the signal energy of the audio signal may be determined for each frequency band, and the microphone blockage degree information of the main microphone in different frequency bands may be determined according to the signal energy of the audio signal in different frequency bands.

In some exemplary embodiments, energy detection may be performed in two frequency bands (i.e., a high frequency band and a low frequency band), and the division of the high frequency band and the low frequency band is not limited in the present disclosure; for example, 2 kHz may be used as a boundary, the frequency band lower than 2 kHz may be the low frequency band, and the frequency band higher than 2 kHz may be the high frequency band. The signal energy of the main audio signal collected by the main microphone in the high frequency band may be represented as $Eng_{main,H}$, and the signal energy of the auxiliary audio signal collected by the auxiliary microphone in the high frequency band may be represented as $Eng_{ref,H}$. The signal energy of the main audio signal collected by the main microphone in the low frequency band may be represented as $Eng_{main,L}$, and the signal energy of the auxiliary audio signal collected by the auxiliary microphone in the low frequency band may be represented as $Eng_{ref,L}$. For the microphone blockage degree information $ratio_H$ corresponding to the high frequency band and the microphone blockage degree information $ratio_L$ corresponding to the low frequency band, reference may be made to formula 5.

$$ratio_H = \frac{Eng_{main,H}}{Eng_{ref,H}} \qquad \text{(Formula 5)}$$

$$ratio_L = \frac{Eng_{main,H}}{Eng_{ref,L}}$$

Some exemplary embodiments of the present disclosure provide an audio processing method. To further improve the quality of the synthesized target audio signal, the feature information of the main microphone obtained in current time periods may be corrected in conjunction with history information between the current time periods, so as to improve the accuracy of the obtained feature information of the main microphone; then, the target audio signal may be synthesized based on the more accurate feature information of the main microphone, so as to improve the quality of the target audio signal.

In some exemplary embodiments, the synthesizing the main audio signal and the adjusted auxiliary audio signal into the target audio signal according to the feature information of the main microphone may include:

obtaining first feature information of the main microphone in the current time period and second feature information of the main microphone in a previous time period adjacent to the current time period;

correcting the first feature information according to the second feature information; and synthesizing the main audio signal and the adjusted auxiliary audio signal into the target audio signal according to the corrected first feature information.

In some exemplary embodiments, the correcting the first feature information according to the second feature information may include:

obtaining a weight of the first feature information and a weight of the second feature information; and correcting the first feature information according to the first feature information, the weight of the first feature information, the second feature information, and the weight of the second feature information.

The wind noise scenario may be taken as an example. First wind noise degree information of the main microphone in the current time period may be denoted as R1, and second wind noise degree information of the main microphone in the previous time period adjacent to the current time period may be denoted as R0. A weight of the first wind noise degree information R1 may be denoted as a1, and a weight of the second wind noise degree information R0 may be denoted as a0. For example, $a0=1-a1$. Then, the corrected first wind noise degree information R1' may be $a1\times R1+(1-a1)\times R0$.

Figure 8:
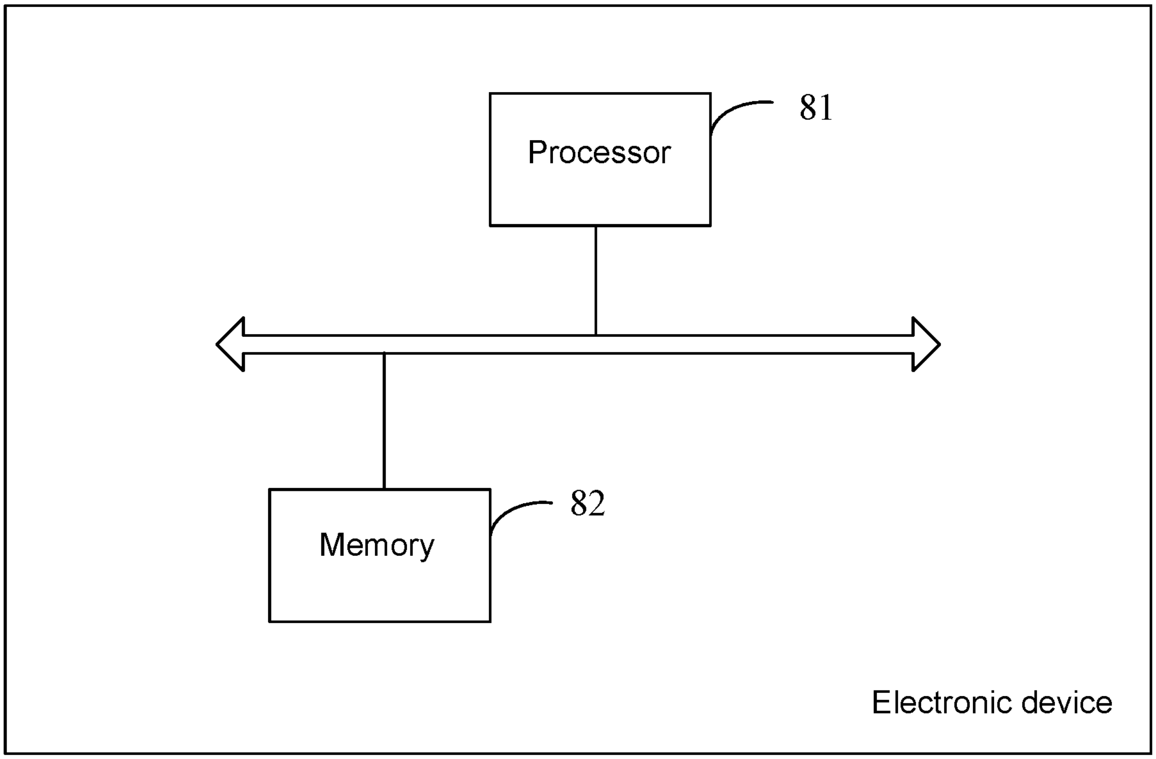
FIG. 8 is a structural diagram of the electronic device according to some exemplary embodiments of the present disclosure.

FIG. 8 is a structural diagram of an electronic device according to some exemplary embodiments of the present disclosure. As shown in FIG. 8, the electronic device may include a main microphone (not shown) and an auxiliary microphone (not shown), and a sound pickup cavity (not shown) of the main microphone and a sound pickup cavity (not shown) of the auxiliary microphone may both be in communication with an external environment where the electronic device is located; the electronic device may further include a sound pickup protection structure (not shown), and the sound pickup protection structure may be set to weaken an air current entering the sound pickup cavity of the auxiliary microphone from the external environment and/or block a nongaseous substance from entering the sound pickup cavity of the auxiliary microphone;

the electronic device may further include:

at least one storage medium, and as a non-limiting example, the at least one storage medium may be a memory 82 configured to store a program code (e.g., at least one set of instructions); and at least one processor in communication with the at least one storage medium, and as a non-limiting example, the at least one processor may be a processor 81, where during operation, the processor 81 may be configured to invoke the program code (e.g., execute the at least one set of instructions), and when the program code is executed, perform the following operations:

obtaining a main audio signal collected by the main microphone and an auxiliary audio signal collected by the auxiliary microphone; and synthesizing a target audio signal from the main audio signal and the auxiliary audio signal.

In some exemplary embodiments, the processor 81 may be further configured to:

determine a plurality of audio components at different frequency bands in the auxiliary audio signal; and according to the frequency band corresponding to any one of the plural audio components and a preset corresponding relationship between the frequency band and a parameter adjustment for a frequency response parameter, determine a target parameter adjustment for the frequency response parameter of the audio component, and adjust the frequency response parameter of the audio component according to the target parameter adjustment, where the frequency response parameter may include an amplitude parameter and/or a phase parameter, and the corresponding relationship may be determined based on a deviation of the frequency response parameters of sample audios collected from a sample sound source by the main microphone and the auxiliary microphone in the electronic device respectively;

the processor 81 may be specifically configured to:

synthesize the target audio signal from the main audio signal and the adjusted auxiliary audio signal.

In some exemplary embodiments, the processor 81 may be further configured to:

obtain feature information of the main microphone, the feature information including one or more of wind noise degree information, microphone blockage degree information, and overload degree information;

the processor 81 may be specifically configured to:

synthesize the main audio signal and the adjusted auxiliary audio signal into the target audio signal according to the feature information of the main microphone.

In some exemplary embodiments, the processor 81 may be specifically configured to:

determine the feature information according to the main audio signal and the auxiliary audio signal.

In some exemplary embodiments, the feature information may include wind noise degree information, and the wind noise degree information may be determined according to a signal correlation between the main audio signal and the auxiliary audio signal.

In some exemplary embodiments, the feature information may include microphone blockage degree information, and the microphone blockage degree information may be determined according to a magnitude relationship between signal energy of the main audio signal and signal energy of the auxiliary audio signal.

In some exemplary embodiments, the microphone blockage degree information may be determined according to a ratio between the signal energy of the main audio signal and the signal energy of the auxiliary audio signal.

In some exemplary embodiments, the processor 81 may be specifically configured to:

obtain the feature information according to the main audio signal.

In some exemplary embodiments, the electronic device may include at least two main microphones, and the feature information may include the wind noise degree information;

the processor 81 may be specifically configured to:

obtain a first frequency domain signal corresponding to a first main audio signal and a second frequency domain signal corresponding to a second main audio signal, the first main audio signal and the second main audio signal being main audio signals collected by any two of the at least two main microphones respectively; and determine the wind noise degree information based on a correlation between the first frequency domain signal and the second frequency domain signal.

In some exemplary embodiments, the at least two main microphones may be located on different sides of the electronic device respectively.

In some exemplary embodiments, the number of the at least two main microphones may be two, and the two main microphones may be located on a first side and an opposite side of the first side (a second side) of the electronic device respectively.

In some exemplary embodiments, the feature information may include the overload degree information;

the processor 81 may be specifically configured to:

obtain a signal amplitude of the main audio signal in a first preset time period; and determine the overload degree information according to the signal amplitude in the first preset time period.

In some exemplary embodiments, the overload degree information may be determined according to a maximum value of an absolute value of the signal amplitude in the first preset time period.

In some exemplary embodiments, the processor 81 may be specifically configured to:

determine a repair coefficient according to the feature information, the repair coefficient including a first weight corresponding to the main audio signal and/or a second weight corresponding to the adjusted auxiliary audio signal; and synthesize the target audio signal according to the first weight and/or the second weight and the adjusted auxiliary audio signal.

In some exemplary embodiments, the feature information may include the wind noise degree information, and the repair coefficient may include the first weight and the second weight;

the processor 81 may be specifically configured to:

obtain a main frequency domain signal corresponding to the main audio signal and an auxiliary frequency domain signal corresponding to the adjusted auxiliary audio signal; and determine a sum of a first correction signal and a second correction signal as the target audio signal, the first correction signal being a product of the main frequency domain signal and the first weight, and the second correction signal being a product of the auxiliary frequency domain signal and the second weight.

In some exemplary embodiments, the wind noise degree information may have a mapping function relationship with the first weight, a sum of the first weight and the second weight is equal to 1, and the mapping function relationship may include any one of a linear function relationship, an exponential function relationship, or a logarithmic function relationship.

In some exemplary embodiments, the feature information may include the microphone blockage degree information, and the repair coefficient may include the second weight;

the processor 81 may be specifically configured to:

determine whether the main microphone is blocked according to the microphone blockage degree information; and if the main microphone is determined to be blocked, determine a product of the adjusted auxiliary audio signal and the second weight as the target audio signal.

In some exemplary embodiments, the processor 81 may be specifically configured to:

obtain a plurality of pieces of microphone blockage degree information in a second preset time period;

obtain an average value of the plurality of pieces of microphone blockage degree information;

determine whether the average value is less than a preset average value;

if the average value is less than the preset average value, determine that the main microphone is blocked; and if the average value is greater than or equal to the preset average value, determine that the main microphone is not blocked.

In some exemplary embodiments, the second weight may be 1.

In some exemplary embodiments, the feature information may include the overload degree information, and the repair coefficient may include the second weight;

the processor 81 may be specifically configured to:

determine whether the main microphone is overloaded according to the overload degree information; and if the main microphone is determined to be overloaded, determine a product of the adjusted auxiliary audio signal and the second weight as the target audio signal.

In some exemplary embodiments, the processor 81 may be specifically configured to:

determine whether the overload degree information is greater than a first preset threshold;

if the overload degree information is greater than the first preset threshold, determine that the main microphone is overloaded; and if the overload degree information is less than or equal to the first preset threshold, determine that the main microphone is not overloaded.

In some exemplary embodiments, the processor 81 may be specifically configured to:

perform frequency domain transformation on each target signal to obtain frequency components of the target signal in a plurality of frequency bands, the target signal including the main audio signal, or the target signal including the main audio signal and the auxiliary audio signal; and obtain the feature information of the main microphone in each frequency band according to the frequency components of the target signal in the plurality of frequency bands;

the processor 81 may be specifically configured to:

obtain frequency components of the adjusted auxiliary audio signal in the plurality of frequency bands; and for each of the plurality of frequency bands, according to the feature information of the main microphone in the frequency band, synthesize the frequency component of the main audio signal in the frequency band and the frequency component of the adjusted auxiliary audio signal in the frequency band into a frequency component of the target audio signal in the frequency band.

In some exemplary embodiments, the processor 81 may be specifically configured to:

obtain first feature information of the main microphone in the current time period and second feature information of the main microphone in a previous time period adjacent to the current time period;

correct the first feature information according to the second feature information; and synthesize the main audio signal and the adjusted auxiliary audio signal into the target audio signal according to the corrected first feature information.

In some exemplary embodiments, the processor 81 may be specifically configured to:

obtain a weight of the first feature information and a weight of the second feature information; and correct the first feature information according to the first feature information, the weight of the first feature information, the second feature information, and the weight of the second feature information.

In some exemplary embodiments, the main microphone may be close to a casing of the electronic device relative to the auxiliary microphone.

In some exemplary embodiments, the sound pickup protection structure may include a windproof structure, and the auxiliary microphone may be provided in the windproof structure.

In some exemplary embodiments, the windproof structure may include a hollow windproof enclosure and a support for supporting the windproof enclosure, and the auxiliary microphone may be provided in a cavity of the windproof enclosure.

In some exemplary embodiments, the sound pickup protection structure may include a dustproof structure, and the auxiliary microphone may be provided in the dustproof structure.

In some exemplary embodiments, the dustproof structure may include at least one filter screen covering the auxiliary microphone.

The electronic device according to some exemplary embodiments of the present disclosure may execute the audio processing method shown in FIGS. 3 to 7, and the technical principle and the technical effect are similar and not repeated herein.

Some exemplary embodiments of the present disclosure further provide an audio processing method. The audio processing method may include:

obtaining a main audio signal and an auxiliary audio signal, the main audio signal and the auxiliary audio signal being collected from a same sound source at the same time, and the auxiliary audio signal and the main audio signal having different amplitudes and/or phases at specific frequencies;

determining a plurality of audio components at different frequency bands in the auxiliary audio signal;

according to the frequency band corresponding to any one of the plural audio components and a preset corresponding relationship between the frequency band and a parameter adjustment for a frequency response parameter, determining a target parameter adjustment for the frequency response parameter of the audio component, and adjusting an amplitude parameter and/or a phase parameter of the audio component according to the target parameter adjustment; and synthesizing a target audio signal from the main audio signal and the adjusted auxiliary audio signal.

In some exemplary embodiments, the main audio signal may be collected by a main microphone provided on an electronic device, and the auxiliary audio signal may be collected by an auxiliary microphone provided on the electronic device.

In some exemplary embodiments, the corresponding relationship may be determined based on a deviation of frequency response parameters of sample audios collected from a sample sound source by the main microphone and the auxiliary microphone in the electronic device respectively.

In some exemplary embodiments, the method may further include:

obtaining feature information of the main microphone, the feature information including one or more of wind noise degree information, microphone blockage degree information, and overload degree information;

the synthesizing a target audio signal from the main audio signal and the adjusted auxiliary audio signal may include:

synthesizing the main audio signal and the adjusted auxiliary audio signal into the target audio signal according to the feature information of the main microphone.

In some exemplary embodiments, the obtaining feature information of the main microphone may include:

determining the feature information according to the main audio signal and the auxiliary audio signal.

In some exemplary embodiments, the feature information may include wind noise degree information, and the wind noise degree information may be determined according to a signal correlation between the main audio signal and the auxiliary audio signal.

In some exemplary embodiments, the feature information may include microphone blockage degree information, and the microphone blockage degree information may be determined according to a magnitude relationship between signal energy of the main audio signal and signal energy of the auxiliary audio signal.

In some exemplary embodiments, the microphone blockage degree information may be determined according to a ratio between the signal energy of the main audio signal and the signal energy of the auxiliary audio signal.

In some exemplary embodiments, the obtaining feature information of the main microphone may include:

obtaining the feature information according to the main audio signal.

In some exemplary embodiments, the electronic device may include at least two main microphones, and the feature information may include the wind noise degree information;

the obtaining the feature information according to the main audio signal may include:

obtaining a first frequency domain signal corresponding to a first main audio signal and a second frequency domain signal corresponding to a second main audio signal, the first main audio signal and the second main audio signal being main audio signals collected by any two of the at least two main microphones respectively; and determining the wind noise degree information based on a correlation between the first frequency domain signal and the second frequency domain signal.

In some exemplary embodiments, the feature information may include the overload degree information;

the obtaining the feature information according to the main audio signal may include:

obtaining a signal amplitude of the main audio signal in a first preset time period; and determining the overload degree information according to the signal amplitude in the first preset time period.

In some exemplary embodiments, the overload degree information may be determined according to a maximum value of an absolute value of the signal amplitude in the first preset time period.

In some exemplary embodiments, the synthesizing the main audio signal and the adjusted auxiliary audio signal into the target audio signal according to the feature information of the main microphone may include:

determining a repair coefficient according to the feature information, the repair coefficient including a first weight corresponding to the main audio signal and/or a second weight corresponding to the adjusted auxiliary audio signal; and synthesizing the target audio signal according to the first weight and/or the second weight and the adjusted auxiliary audio signal.

In some exemplary embodiments, the feature information may include the wind noise degree information, and the repair coefficient may include the first weight and the second weight;

the synthesizing the target audio signal according to the first weight and/or the second weight and the adjusted auxiliary audio signal may include:

obtaining a main frequency domain signal corresponding to the main audio signal and an auxiliary frequency domain signal corresponding to the adjusted auxiliary audio signal; and determining a sum of a first correction signal and a second correction signal as the target audio signal, the first correction signal being a product of the main frequency domain signal and the first weight, and the second correction signal being a product of the auxiliary frequency domain signal and the second weight.

In some exemplary embodiments, the wind noise degree information may have a mapping function relationship with the first weight, a sum of the first weight and the second weight is equal to 1, and the mapping function relationship may include any one of a linear function relationship, an exponential function relationship, and a logarithmic function relationship.

In some exemplary embodiments, the feature information may include the microphone blockage degree information, and the repair coefficient may include the second weight;

the synthesizing the target audio signal according to the first weight and/or the second weight and the adjusted auxiliary audio signal may include:

determining whether the main microphone is blocked according to the microphone blockage degree information; and if the main microphone is determined to be blocked, determining a product of the adjusted auxiliary audio signal and the second weight as the target audio signal.

In some exemplary embodiments, the determining whether the main microphone is blocked according to the microphone blockage degree information may include:

obtaining a plurality of pieces of microphone blockage degree information in a second preset time period;

obtaining an average value of the plurality of pieces of microphone blockage degree information;

determining whether the average value is less than a preset average value;

if the average value is less than the preset average value, determining that the main microphone is blocked; and if the average value is greater than or equal to the preset average value, determining that the main microphone is not blocked.

In some exemplary embodiments, the second weight is 1.

In some exemplary embodiments, the feature information may include the overload degree information, and the repair coefficient may include the second weight;

the synthesizing the target audio signal according to the first weight and/or the second weight and the adjusted auxiliary audio signal may include:

determining whether the main microphone is overloaded according to the overload degree information; and if the main microphone is determined to be overloaded, determining a product of the adjusted auxiliary audio signal and the second weight as the target audio signal.

In some exemplary embodiments, the determining whether the main microphone is overloaded according to the overload degree information may include:

determining whether the overload degree information is greater than a first preset threshold;

if the overload degree information is greater than the first preset threshold, determining that the main microphone is overloaded; and if the overload degree information is less than or equal to the first preset threshold, determining that the main microphone is not overloaded.

In some exemplary embodiments, the obtaining feature information of the main microphone may include:

performing frequency domain transformation on each target signal to obtain frequency components of the target signal in a plurality of frequency bands, the target signal including the main audio signal, or the target signal including the main audio signal and the auxiliary audio signal; and obtaining the feature information of the main microphone in each frequency band according to the frequency components of the target signal in the plurality of frequency bands;

the synthesizing the main audio signal and the adjusted auxiliary audio signal into the target audio signal according to the feature information of the main microphone may include:

obtaining frequency components of the adjusted auxiliary audio signal in the plurality of frequency bands; and for each of the plurality of frequency bands, according to the feature information of the main microphone in the frequency band, synthesizing the frequency component of the main audio signal in the frequency band and the frequency component of the adjusted auxiliary audio signal in the frequency band into a frequency component of the target audio signal in the frequency band.

In some exemplary embodiments, the synthesizing the main audio signal and the adjusted auxiliary audio signal into the target audio signal according to the feature information of the main microphone may include:

obtaining first feature information of the main microphone in the current time period and second feature information of the main microphone in a previous time period adjacent to the current time period;

correcting the first feature information according to the second feature information; and synthesizing the main audio signal and the adjusted auxiliary audio signal into the target audio signal according to the corrected first feature information.

In some exemplary embodiments, the correcting the first feature information according to the second feature information may include:

obtaining a weight of the first feature information and a weight of the second feature information; and correcting the first feature information according to the first feature information, the weight of the first feature information, the second feature information, and the weight of the second feature information.

For the audio processing method according to some exemplary embodiments of the present disclosure, reference may be made to FIGS. 3 to 7, and the technical principle and the technical effect are similar and not repeated herein.

Some exemplary embodiments of the present disclosure further provide an electronic device, and for a structure of the electronic device, reference may be made to FIG. 8. The electronic device may include:

a memory 82 configured to store a program code; and a processor 81 configured to invoke the program code, and when the program code is executed, the electronic device may perform the following operations:

obtaining a main audio signal and an auxiliary audio signal, the main audio signal and the auxiliary audio signal being collected from a same sound source at the same time, and the auxiliary audio signal and the main audio signal having different amplitudes and/or phases at specific frequencies;

determining a plurality of audio components at different frequency bands in the auxiliary audio signal;

according to the frequency band corresponding to any one of the plural audio components and a preset corresponding relationship between the frequency band and a parameter adjustment for a frequency response parameter, determining a target parameter adjustment for the frequency response parameter of the audio component, and adjusting an amplitude parameter and/or a phase parameter of the audio component according to the target parameter adjustment; and synthesizing a target audio signal from the main audio signal and the adjusted auxiliary audio signal.

In some exemplary embodiments, the main audio signal may be collected by a main microphone provided on an electronic device, and the auxiliary audio signal may be collected by an auxiliary microphone provided on the electronic device.

In some exemplary embodiments, the corresponding relationship may be determined based on a deviation of frequency response parameters of sample audios collected from a sample sound source by the main microphone and the auxiliary microphone in the electronic device respectively.

In some exemplary embodiments, the processor may be further configured to:

obtain feature information of the main microphone, the feature information including one or more of wind noise degree information, microphone blockage degree information, and overload degree information;

the processor may be specifically configured to:

synthesize the main audio signal and the adjusted auxiliary audio signal into the target audio signal according to the feature information of the main microphone.

In some exemplary embodiments, the processor may be specifically configured to:

determine the feature information according to the main audio signal and the auxiliary audio signal.

In some exemplary embodiments, the feature information may include wind noise degree information, and the wind noise degree information may be determined according to a signal correlation between the main audio signal and the auxiliary audio signal.

In some exemplary embodiments, the feature information may include microphone blockage degree information, and the microphone blockage degree information may be determined according to a magnitude relationship between signal energy of the main audio signal and signal energy of the auxiliary audio signal.

In some exemplary embodiments, the microphone blockage degree information may be determined according to a ratio between the signal energy of the main audio signal and the signal energy of the auxiliary audio signal.

In some exemplary embodiments, the processor may be specifically configured to:

obtain the feature information according to the main audio signal.

In some exemplary embodiments, the electronic device may include at least two main microphones, and the feature information may include the wind noise degree information;

the processor may be specifically configured to:

obtain a first frequency domain signal corresponding to a first main audio signal and a second frequency domain signal corresponding to a second main audio signal, the first main audio signal and the second main audio signal being main audio signals collected by any two of the at least two main microphones respectively; and determine the wind noise degree information based on a correlation between the first frequency domain signal and the second frequency domain signal.

In some exemplary embodiments, the feature information may include the overload degree information;

the processor may be specifically configured to:

obtain a signal amplitude of the main audio signal in a first preset time period; and determine the overload degree information according to the signal amplitude in the first preset time period.

In some exemplary embodiments, the overload degree information may be determined according to a maximum value of an absolute value of the signal amplitude in the first preset time period.

In some exemplary embodiments, the processor may be specifically configured to:

determine a repair coefficient according to the feature information, the repair coefficient including a first weight corresponding to the main audio signal and/or a second weight corresponding to the adjusted auxiliary audio signal; and synthesize the target audio signal according to the first weight and/or the second weight and the adjusted auxiliary audio signal.

In some exemplary embodiments, the feature information may include the wind noise degree information, and the repair coefficient may include the first weight and the second weight;

the processor may be specifically configured to:

obtain a main frequency domain signal corresponding to the main audio signal and an auxiliary frequency domain signal corresponding to the adjusted auxiliary audio signal; and determine a sum of a first correction signal and a second correction signal as the target audio signal, the first correction signal being a product of the main frequency domain signal and the first weight, and the second correction signal being a product of the auxiliary frequency domain signal and the second weight.

In some exemplary embodiments, the wind noise degree information may have a mapping function relationship with the first weight, a sum of the first weight and the second weight is equal to 1, and the mapping function relationship may include any one of a linear function relationship, an exponential function relationship, and a logarithmic function relationship.

In some exemplary embodiments, the feature information may include the microphone blockage degree information, and the repair coefficient may include the second weight;

the processor may be specifically configured to:

determine whether the main microphone is blocked according to the microphone blockage degree information; and if the main microphone is determined to be blocked, determine a product of the adjusted auxiliary audio signal and the second weight as the target audio signal.

In some exemplary embodiments, the processor may be specifically configured to:

obtain a plurality of pieces of microphone blockage degree information in a second preset time period;

obtain an average value of the plurality of pieces of microphone blockage degree information;

determine whether the average value is less than a preset average value;

if the average value is less than the preset average value, determine that the main microphone is blocked; and if the average value is greater than or equal to the preset average value, determine that the main microphone is not blocked.

In some exemplary embodiments, the second weight is 1.

In some exemplary embodiments, the feature information may include the overload degree information, and the repair coefficient may include the second weight;

the processor may be specifically configured to:

determine whether the main microphone is overloaded according to the overload degree information; and if the main microphone is determined to be overloaded, determine a product of the adjusted auxiliary audio signal and the second weight as the target audio signal.

In some exemplary embodiments, the processor may be specifically configured to:

determine whether the overload degree information is greater than a first preset threshold;

if the overload degree information is greater than the first preset threshold, determine that the main microphone is overloaded; and if the overload degree information is less than or equal to the first preset threshold, determine that the main microphone is not overloaded.

In some exemplary embodiments, the processor may be specifically configured to:

perform frequency domain transformation on each target signal to obtain frequency components of the target signal in a plurality of frequency bands, the target signal including the main audio signal, or the target signal including the main audio signal and the auxiliary audio signal; and obtain the feature information of the main microphone in each frequency band according to the frequency components of the target signal in the plurality of frequency bands;

the processor may be specifically configured to:

obtain frequency components of the adjusted auxiliary audio signal in the plurality of frequency bands; and for each of the plurality of frequency bands, according to the feature information of the main microphone in the frequency band, synthesize the frequency component of the main audio signal in the frequency band and the frequency component of the adjusted auxiliary audio signal in the frequency band into a frequency component of the target audio signal in the frequency band.

In some exemplary embodiments, the processor may be specifically configured to:

obtain first feature information of the main microphone in the current time period and second feature information of the main microphone in a previous time period adjacent to the current time period;

correct the first feature information according to the second feature information; and synthesize the main audio signal and the adjusted auxiliary audio signal into the target audio signal according to the corrected first feature information.

In some exemplary embodiments, the processor may be specifically configured to:

obtain a weight of the first feature information and a weight of the second feature information; and correct the first feature information according to the first feature information, the weight of the first feature information, the second feature information and the weight of the second feature information.

It should be noted that the various exemplary embodiments of the present disclosure may be combined with each other, and a combination manner is not limited in the present disclosure. Types of the electronic device, the processor and the memory, as well as implementations and electrical connection relationships of the processor are not limited in the present disclosure. For example, the processor may be electrically connected with the microphones through pins to obtain the main audio signal collected by the main microphone and the auxiliary audio signal collected by the auxiliary microphone, and perform the corresponding processing operations.

It should be understood that the processor may be a general purpose processor, a digital signal processor, an application specific integrated circuit, a field programmable gate array or another programmable logic device, discrete gate or transistor logic device, and a discrete hardware component, and may implement or perform the methods, steps, and logic block diagrams disclosed in the exemplary embodiments of the present disclosure. The general purpose processor may be a microprocessor or any conventional processor, or the like. The steps of the method according to the exemplary embodiments of the present disclosure may be directly embodied by a hardware processor, or by a combination of hardware and software modules in the processor.

In some exemplary embodiments of the present disclosure, the memory may be a nonvolatile memory, such as a hard disk drive (HDD) or a solid-state drive (SSD), or the like, and may also be a volatile memory, such as a random-access memory (RAM). The memory may be any medium which may be configured to carry or store desired program codes in the form of instructions or data structures and may be accessed by a computer, but is not limited thereto. The memory in the exemplary embodiments of the present disclosure may also be circuitry or any other device capable of storing and may be configured to store program instructions and/or data.

Those skilled in the art may understand that all or part of the steps for implementing the above-mentioned exemplary method embodiments may be performed by hardware associated with program instructions. The foregoing program may be stored in a computer-readable storage medium. When executed, the program may perform steps including the above-mentioned exemplary method embodiments; and the aforementioned storage medium may include various media which may store program codes, such as a ROM, a RAM, a magnetic disk, an optical disk, or the like.

Finally, it should be noted that the foregoing exemplary embodiments are merely intended for describing the technical solutions of the exemplary embodiments of the present disclosure, rather than limiting the present disclosure. Although the exemplary embodiments of the present disclosure are described in detail with reference to the foregoing exemplary embodiments, a person of ordinary skill in the art should understand that they may still make modifications to the technical solutions described in the foregoing exemplary embodiments, or make equivalent replacements to some or all the technical features thereof, without departing from the scope of the technical solutions of the exemplary embodiments of the present disclosure.

What is claimed is:

1. An electronic device, comprising:

an auxiliary microphone with a sound pickup protection structure;

a first main microphone without the sound pickup protection structure;

a second main microphone without the sound pickup protection structure;

at least one storage medium storing at least one set of instructions; and at least one processor in communication with the at least one storage medium, wherein during operation, the at least one processor executes the at least one set of instructions to:

obtain a first main audio signal collected by the first main microphone, a second main audio signal collected by the second main microphone, and an auxiliary audio signal collected by the auxiliary microphone, obtain a first frequency domain signal corresponding to the first main audio signal and a second frequency domain signal corresponding to the second main audio signal, determine feature information based on a correlation between the first frequency domain signal and the second frequency domain signal, wherein the feature information comprises wind noise degree information, and synthesize a target audio signal from a target main audio signal and the auxiliary audio signal based on the feature information, wherein the target main audio signal is the first main audio signal or the second main audio signal.

2. The electronic device according to claim 1, wherein to synthesize the target audio signal, the at least one processor further executes the set of instructions to:

obtain an adjusted auxiliary audio signal by adjusting a frequency response of the auxiliary audio signal to reduce a deviation between a frequency response of the auxiliary audio signal and a frequency response of the first main audio signal and the second main audio signal; and synthesize the target audio signal from the target main audio signal and the adjusted auxiliary audio signal based on the feature information.

3. The electronic device according to claim 2, wherein the auxiliary audio signal comprises a plurality of audio components at different frequency bands, wherein to obtain the adjusted auxiliary audio signal, the at least one processor further executes the set of instructions to: for each of the plurality of audio components, determine a target adjustment of a frequency response parameter of the audio component based on a preset corresponding relationship and a frequency band corresponding to the audio component, adjust the frequency response parameter based on the target adjustment, wherein the frequency response parameter comprises at least one of an amplitude parameter or a phase parameter, and the preset corresponding relationship is determined based on a deviation between the frequency response parameter of sample audio collected from a sample sound source by a target main microphone, wherein the target main microphone is the first main microphone or the second main microphone, and the frequency response parameter of sample audio collected from the sample sound source by the auxiliary microphone.

4. The electronic device according to claim 1, wherein the sound pickup protection structure is configured to conduct at least one of:

weakening an air current entering a sound pickup cavity of the auxiliary microphone from the external environment, or blocking a nongaseous substance from entering the sound pickup cavity of the auxiliary microphone.

5. The electronic device according to claim 4, wherein the sound pickup protection structure comprises at least one of a windproof structure or a dustproof structure, and the auxiliary microphone is located in the sound pickup protection structure.

6. The electronic device according to claim 5, wherein the windproof structure comprises a hollow windproof enclosure and a support to support the windproof enclosure, and the auxiliary microphone is located in a cavity of the windproof enclosure.

7. The electronic device according to claim 5, wherein the dustproof structure comprises at least one filter screen covering the auxiliary microphone.

8. The electronic device according to claim 1, wherein the feature information further comprises at least one of microphone blockage degree information or overload degree information.

9. The electronic device according to claim 8, wherein the at least one processor further executes the set of instructions to:

determine the feature information based on the target main audio signal and the auxiliary audio signal.

10. The electronic device according to claim 8, wherein the microphone blockage degree information is determined based on a magnitude relationship between signal energy of the target main audio signal and signal energy of the auxiliary audio signal.

11. The electronic device according to claim 10, wherein the microphone blockage degree information is determined based on a ratio between the signal energy of the target main audio signal and the signal energy of the auxiliary audio signal.

12. The electronic device according to claim 8, wherein the feature information comprises the overload degree information; and the at least one processor further executes the set of instructions to:

obtain a signal amplitude of the target main audio signal in a first preset time period, and determine the overload degree information based on the signal amplitude in the first preset time period.

13. The electronic device according to claim 12, wherein the overload degree information is determined based on a maximum value, an average value, or a weighted average value of the signal amplitudes of the main audio signal in the first preset time period.

14. The electronic device according to claim 13, wherein the overload degree information is determined based on a maximum absolute value of the signal amplitude in the first preset time period.

15. The electronic device according to claim 1, wherein the at least one processor further executes the set of instructions to:

determine a repair coefficient based on the feature information, wherein the repair coefficient comprises at least one of: a main weight corresponding to the target main audio signal or an auxiliary weight corresponding to the auxiliary audio signal; and synthesize the target audio signal based on the repair coefficient and the auxiliary audio signal.

16. The electronic device according to claim 15, wherein the feature information comprises the wind noise degree information, and the repair coefficient comprises the main weight and the auxiliary weight, the at least one processor further executes the set of instructions to:

obtain a main frequency domain signal corresponding to the target main audio signal and an auxiliary frequency domain signal corresponding to the auxiliary audio signal, and determine a sum of a first correction signal and a second correction signal as the target audio signal, the first correction signal being a product of the main frequency domain signal and the main weight, and the second correction signal being a product of the auxiliary frequency domain signal and the auxiliary weight.

17. The electronic device according to claim 16, wherein the wind noise degree information is in a mapping function relationship with the main weight;

a sum of the main weight and the auxiliary weight is equal to 1; and the mapping function relationship is a linear function relationship, an exponential function relationship, or a logarithmic function relationship.

18. The electronic device according to claim 1, wherein a higher correlation between the first frequency domain signal and the second frequency domain indicates a lower influence of wind noise on the first main microphone or the second main microphone.

19. The electronic device according to claim 1, wherein the first main microphone and the second main microphone are located on different sides of the electronic device respectively.

20. The electronic device according to claim 19, wherein the first main microphone is located on a first side; and the second main microphone is located on a second side opposite to the first side of the electronic device.

* * * * *